Nov. 23, 1965  K. BOSSARD  3,218,856
LIQUID LEVEL CONTROL ARRANGEMENT
Filed Sept. 17, 1962
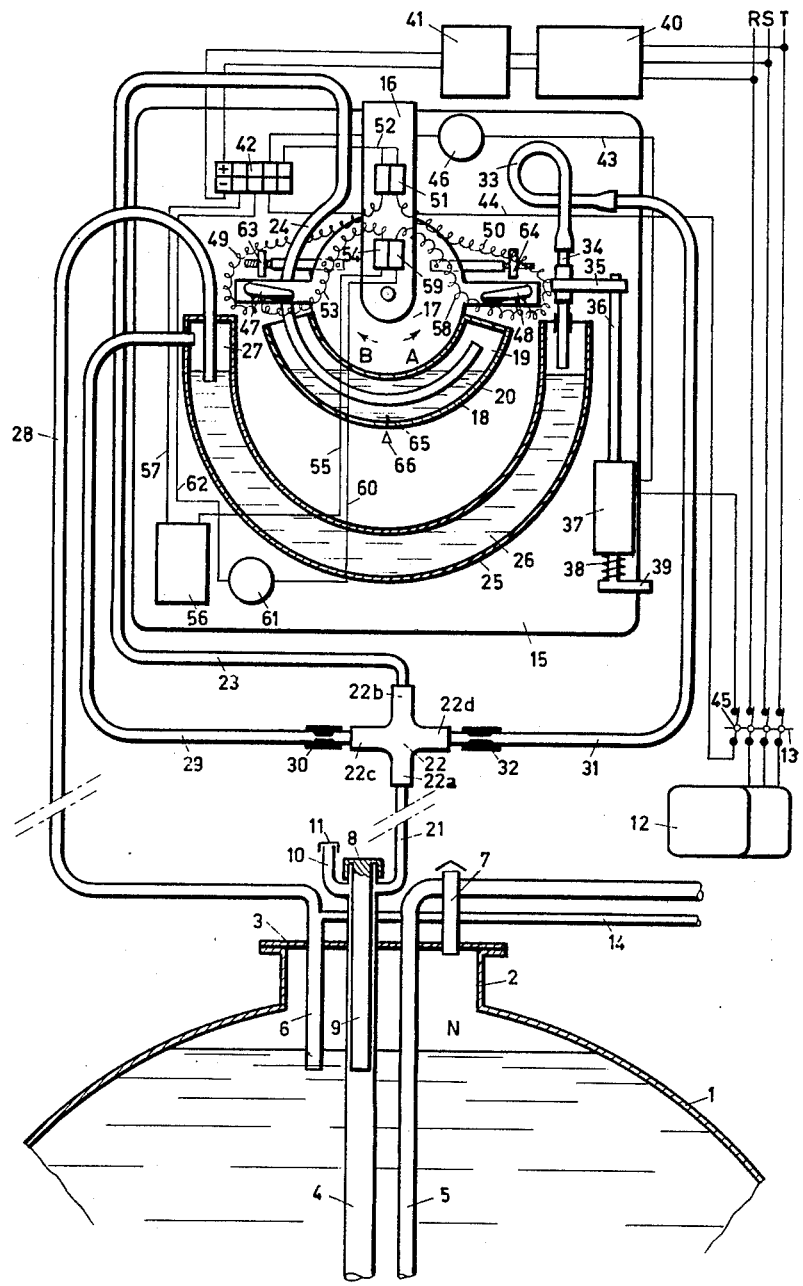
KARL BOSSARD
INVENTOR
BY William A. Drucy 3,218,856
LIQUID LEVEL CONTROL ARRANGEMENT
Karl Bossard, Zurich-Schwamendigen, Switzerland,
assignor to Erich Winistoerfer, Zurich, Switzerland
Filed Sept. 17, 1962, Ser. No. 224,087
Claims priority, application Switzerland, Sept. 20, 1961, 10,900/61
1 Claim. (Cl. 73—290)

Liquid containers, more particularly fuel tanks of oil heating plants and petrol stations, require supervision not only whilst they are being filled, in order to avoid overfilling, but also whilst the oil heating plant of the petrol station is in and out of service in order to discover all kinds of leakage losses of fuel in good time. Known control apparatus is unable, or only insufficiently able, to comply with these requirements. Although there are control or supervisory devices which operate an optical and/or acoustic signal during the filling of such a liquid container, as soon as the maximum admissible liquid level in the container is reached, these control devices are not suitable, however, for discovering losses due to a leak occurring in the liquid container. Supervisory apparatus for liquid containers is also known which certainly indicates by an optical and/or acoustic signal the losses of liquid caused by a leak in the container. Since, however, the latter supervisory devices respond to every reduction of the liquid level in the container, they also come into action during normal consumption, for example upon the operation of the burner of an oil heating plant, during delivery of liquid at any tapping point, and it is not possible to know whether the signal indicates a loss of liquid due to a leak in the container or only the functioning of the burner of an oil heating plant, the tapping point of a petrol station, hereinafter briefly termed consumers. Therefore such control apparatus is usually switched off during the operation of the consumer. However this is very dangerous, particularly with oil heating plants which, in certain cases, may be continuously in use for several months, for losses which are due to leakage of the container, are not indicated during all this time. These disadvantages are removed by the present invention.

This invention concerns a liquid container, more particularly a fuel tank, having a supervisory or control arrangement provided with a filling tube inserted in the cover of a man hole connection, extending to the bottom of the liquid container, closed by a screw cover and provided with a closable ventilation pipe, which container is characterised in that the control arrangement has a switch mechanism which is constructed as a liquid balance, has a closed air space, is provided with two electric switches one of which is provided in the circuit of a warning device indicating the reaching of the maximum degree of filling of the container, and the other in the circuit of a warning device indicating the leakage losses of liquid from the container and that the air space of the switching mechanism, on the one hand, is connected to the air space in the filling tube of the liquid container and, on the other hand, to the air space in a control tube inserted in the cover of the manhole connection and extending only into the top portion of the liquid container, with the result that, during the filling of the container, after the closing of the control tube by the liquid rising in the container, the said control tube experiences a pressure increase which is propagated to the air space of the switch mechanism and thereby causes deflection of this switch mechanism from a neutral centre position in one direction involving closure of one electric switch and thus of the circuit of one warning device and, upon the occurrence of leakage losses from the container, the drop in pressure in the closed tube caused thereby is propagated to the said air space of the switch mechanism and thereby causes deflection of this switch mechanism from the neutral centre position in the other direction, involving closing of the other electric switch and thus of the circuit of the other warning device, whilst a pressure equalising duct is provided which is connected to the air space in the filling tube, is controlled by an electro-magnet switched on and off by the liquid consumer, is open when the consumers are in service, is closed when they are not in service and in which an interchangeable and/or adjustable throttle member is provided which allows only sufficient air to pass through unthrottled as is necessary to equalise the pressure drop in the filling tube caused by the removal of liquid from the container by the consumer.

In the liquid container of the present invention with its supervisory or control apparatus a reliable signal is given not only in filling to indicate reaching of maximum admissible level of the liquid in the container, but also to indicate losses of liquid due to leakage of the container, both when consumers are in service and when they are not in service, without a signal or indication being given during normal extraction of liquid from the container by the consumer.

An embodiment of the liquid container, namely an oil tank of an oil heating plant, having a supervisory or control arrangement in accordance with the present invention, is illustrated schematically in the drawings.

An oil tank 1 of an oil heating plant has a manhole connection 2 which is closed by a cover 3. A filling tube 4 extending to the bottom of the oil tank 1, an extraction tube 5, also extending to the bottom of the oil tank 1 and a supervisory or control tube 6 extending only as far as the upper portion of the oil tank, pass through the cover 3 which is provided with an air pipe 7. The filling tube 4 is closed by a screw cover 8 on which a rod-like displacement member 9 is located extending with play into the filling tube 4. The screw cover 8 with its displacement member 9 is unscrewed and removed only for filling the oil tank 1. A ventilator pipe 10, which can be closed by a screw cover 11, branches from the upper part of the filling tube 4. The extraction tube 5 leads to the consumer, in the present case the feed pump 12 of an oil burner (not shown), said pump being driven by an electric motor which may be connected by way of a switch 13 to a mains supply RST. When the oil burner is in service it is fed with oil under pressure from the pump 12, the oil being sucked from the tank 1 through the extraction tube 5. The feed pump 12 is preferably constructed to suck up always the same quantity of oil, irrespective of whether the oil burner is in full operation or only throttled. Excess oil not consumed by the burner is passed by the feed pump 12 back to the oil tank 1 through a return duct 14 communicating with the control tube 6.

An instrument panel 15 is mounted at a suitable place on the wall. A yoke 16 is secured to the instrument panel 15 and the spindle of a dial switch 17 is mounted between the arms of this yoke with as little friction as possible, for example, on points. Secured to the lower part of this dial switch 17 is an arcuate tube 18 which is closed at one (in the drawing the right) end and is open at the other end, and which in its lower portion contains a liquid 20 which seals an air space 19 in the closed end portion of the tube and evaporates and adheres as little as possible. A tube 21 connected to the upper part of the filling tube 4 constricted by the displacement member 9 is connected to one arm 22a of a 4-way branch member 22. A pipe line 23 leads from the arm 22b of the 4-way branch member 22 to the instrument panel 15 where it merges into an arcuate tube 24 which is rigidly mounted on the instrument panel 15 and extends into the tube 18 without coming into contact therewith and communicates with the closed air space 19 thereof.

A U-shaped tube 25 is also rigidly mounted on the instrument panel 15; one side of this pipe 25, in the case shown, the left side, is closed and the other open. This U-pipe contains a liquid 26 which evaporates and adheres as little as possible and seals an air chamber 27 in the closed side of the U-tube 25. The upper end of a pipe 28 extends downwardly into the closed side of the U-tube 25; the lower end of this pipe 28 is connected to the control tube 6. A pipe-line 29 extends from the upper portion of the air chamber 27 in the tube 25 to the arm 22c of the four-way branch member 22. An interchangeable or adjustable throttle member is provided in this pipe-line, in the case illustrated, an interchangeable throttle nozzle 30. An exchangeable nozzle 32 is incorporated in a pipe-line 31 extending from the arm 22d of the four-way branch member 22. One end of a flexible tube 33 is connected to the pipe-line 31. The other end of the pipe-line 31 is connected to a tube 34 supported in a holder 35 and engaging from above in the open side of the U-tube 25 without being in contact therewith. The holder 35 is disposed on a rod 36 which is connected to the armature of an electro-magnet 37 in such a manner that the holder 35 can be moved upwardly with the tube 34 by the electro-magnet 37 from its lowest position. The armature of the electro-magnet 37 is provided with a handle 39 by means of which it can be moved by hand. The armature of the electro-magnet 37 is pressed by a spring 38 into its lowest position. If necessary, however, the weight of the armature of the electro-magnet 37, the rod 36 and the holder 35 may also suffice to bring the armature reliably to its lowest position. A transformer 40 is connected to the supply mains RST and has an output of 4 to 8 volts, which is supplied to a rectifier 41. The rectifier 41 supplies direct current to a series of terminals 42. The electro-magnet 37 is connected by electrical leads 43 and 44 to the series of terminals 42, the lead 44 having a switch 45 which is mechanically coupled to the switch 13 of the electric motor of the feed-pump 12 so that the electro-magnet 37 attracts when and for as long as the electric motor of the feed pump 12 is switched on. A signal lamp 46 is provided in the lead 43; the lamp 46 shines continuously as long as the electric motor of the feed pump 12 is switched on and the electro-magnet 37 is energised.

Two mercury switches 47 and 48 are correspondingly arranged on the dial switch 17, diametrically opposed to each other. The outer poles of these switches are connected by flexible conductors 49 and 50 respectively to terminals 51 which are provided on the yoke 16 and in turn is connected by a conductor 52 to one pole of the series of terminals 42. The inner pole of the mercury switch 47 is connected by a flexible conductor 53 to a terminal 54 which is provided on the yoke 16 and is connected by a conductor 55 to one pole of an electrically operated acoustic and/or optical signalling device 56; the other end of the device 56 is connected by a conductor 57 to the other pole of the series of terminals 42. The inner pole of the mercury switch 48 is connected by a flexible lead 58 to a terminal 59 which is arranged on the yoke 16 and from which a conductor 60 leads to a signal lamp 61, the other side of which is connected by a conductor 62 to the series of terminals 42. The dial switch 17 with the tube 18, together with the liquid contained therein and the two mercury switches 47 and 48 form an electrical liquid balance, which is influenced by the pressure obtained from the air-pace 19 in the pipe 18 closed by the tube 24 and which, when deflected in one or other direction, either operates the signal device 56 or causes the signal lamp 61 to flash.

For adjustment purposes the dial switch 17 has two laterally projecting arms with threaded spindles on which adjusting screws 63 and 64 are engaged. The tube 18 is also provided with an index stroke 65 and the instrument panel 15 with a mark 66 which render possible accurate setting of the dial switch 17 and in the event of a break down of current indicate whether the dial switch is in its neutral centre position or deflected to either side.

In a condition of rest, i.e., when no oil is being taken from the oil tank 1 and no oil is being filled into it, and assuming that the oil tank 1 is not damaged, that is say no oil is being wasted by leakage losses, the switch dial 17 is in the centre position, i.e., the index stroke 65 coincides with the mark 66. The switch 13 of the electric motor of the feed pump 12 and the switch 45 of the electro-magnet 37 are opened, i.e., the circuits of the electric motor of the feed pump 13 and the electro-magnet 37 are broken and the signal lamp 46 does not shine. Both mercury switches 47 and 48 are in the open-circuit condititon; the mercury switch 47 breaks the circuit of the signal device 56 and the mercury switch 48 breaks the circuit of the signal lamp 61. Since the electro-magnet 37 is not energised, the spring 38 keeps the armature thereof, together with the rod 36 and the holder 35 with the tube 34, in the lowest position, in which the pipe 34 dips into the liquid 26 contained in the U-pipe 25. The end of the pipe 28 also dips into this liquid 26.

In order to fill the oil tank 1, the screw cover 8 is unscrewed from the filling tube 4 and removed together with the displacement body 9. Likewise the screw cover 11 is removed from the ventilation pipe 10. The flexible filling tube of the tanker is connected to the filling pipe 4. When the oil tank 1 is being filled with oil the air displaced therefrom escapes through the air-pipe 7 and the air contained in the filling pipe 4 can flow off through the ventilation pipe 10. The compact jet of oil in the filling tube 4 seals therein the mouth of the pipe 21. The level of the oil in the tank 1 rises and, when it has approximately reached its highest admissible level N, it closes the control tube 6 which extends only into the upper portion of the oil tank 1. The air in the control tube 6 is compressed by the further rise of the level of the oil in the tank 1 and since, during the filling of the oil tank 1, the consumer, and consequently, the feed pump 12 is not in operation, the return pipe-line 14 is therefore closed, the air is displaced through the pipe 28, bubbles through the liquid 26 and reaches the air chamber 27 from which it flows through the pipe 29 to the four-way branch member 22. This air cannot flow away through the pipe-line 31, since the pipe 34 is closed by the liquid 26 in the U-pipe 25 and, likewise, this air cannot escape through the pipe 21 to the intake pipe 4. The air fed to the four-way branch member 22, from the control tube 6, must therefore, flow off through the pipe 23 and the pipe 24 connected thereto and flows into the air-space 19 in the arcuate tube 18, and presses back the liquid 20 contained in the latter. This results in a displacement of weight which in turn results in turning of the switch dial 17 in the direction of the arrow A. Due to this turning of the dial switch 17, the mercury switch 47 and consequently the circuit of the acoustic and/or optical signal device 56 is closed which now comes into action. Instead of only one signal device 56, several signal devices connected in parallel may be provided at various places. After the signal device 56 comes into operation, the filling of oil in the tank 1 is concluded. The oil in the tank 1 has by then reached the highest permissible level N.

Since the oil is usually conveyed to the tank 1 at a somewhat elevated temperature it is cooled down somewhat by storage in the oil tank 1 and its volume is somewhat reduced. This reduction of volume must not be incorrectly indicated as a loss. This is achieved with the described control or supervisory arrangement as follows:

In the case of a thermally induced reduction in the volume of the oil in the tank 1, the level of the oil in the filling pipe 4 sinks and this results in a reduction in the pressure of the air contained therein, this reduction becoming even more pronounced by the displacement member 9 reducing the air volume in the filling chamber 4. This pressure reduction is distributed through the pipe 21, the four-way branch 22 and the pipe 29 to the air space 27 in the U-tube 25, causing the liquid 26 to be raised in the U-tube 25 by suction. Thus the level of the liquid on the other side of the U-tube 25 drops so that the mouth of the pipe 34 is uncovered by the liquid 26. The result of this is that air can flow through the pipe 34, the flexible tube 33 and the pipe-line 31 to the four-way branch 22 and from the latter to the filling tube 4 and effects the pressure equalisation therein. Since this is a very small and slow pressure reduction in the filling pipe 4 which can be very quickly equalised, the dial switch 17 is not influenced.

If the oil tank 1 has a leak so that oil losses occur, this also results in a pressure reduction of the air in the filling pipe 4, which, however, occurs much more quickly and is larger than in the case of the already mentioned thermally induced reduction of volume of the oil in the tank 1. Since the after-flow of air from air chamber 27 in the pipe 25 cannot take place quickly enough, due to the correspondingly designed throttle nozzle 30 in the pipe line 29, in order to compensate the reduction of pressure in the filling pipe 4, and since the electromagnet 37 is not energized and its armature is in the lowest position, so that the pipe 24 dips into the liquid 26 in the U-tube 18, i.e., is therefore closed, the pressure reduction in the filling pipe 4 is transmitted through the pipe 23 and the pipe 24 to the air chamber 19 in the arcuate tube 18. The result of this is that the liquid 20 in the tube 18 is exhausted from the air chamber 19, resulting in a shift of weight and consequently turning of the dial switch 17 in the direction of the arrow B. With this rotation of the dial switch 17, the mercury switch 48, and consequently, the circuit of the signal lamp 61 is closed. The flashing of the signal lamp 61, instead of which several parallel signal lamps can be provided at various places, indicates that oil is flowing out of the tank 1 and that the matter must be attended to. Experiments have shown that a very small reduction of the pressure in the filling pipe 4, for example an enlargement of the air space of approximately 2 cubic cm. per minute is sufficient to cause the signal lamp 61 to light up.

If the consumer in the example assumed, that is to say, the oil burner, is put in service, the electric motor of the feed pump 12 is switched on by the closing of the switch 13. At the same time the switch 45 and, consequently, the circuit of the electro-magnet 37, are also closed, the armature of the latter attracting against the force of the spring 38 and thereby raising the rod 36 with the holder 35 so that the end of the pipe 34 is raised from the liquid 26 in the U-tube 25, with the closing of the circuit of electro-magnet 37 the signal lamp 46 lights up and thereby indicates that the consumer, i.e., oil burner, is in service. Naturally, during normal service of the consumer, no warning signal should be operated. This is achieved by the described supervisory mechanism in such manner that the throttle nozzle 32 in the pipe 31 is designed so that it is able to let through a substantially unthrottled air quantity which just suffices to compensate the drop in pressure caused by the maximum extraction of oil from the tank by the feed pump 12 in the filling tube 4. When a consuming apparatus is in service, therefore, exactly that quantity of air is sucked through the pipe 34, the flexible tube 33, the pipe line 31, its throttle nozzle 32, the four-way branch 22 and the pipe 21, which suffices to compensate the pressure reduction occurring in the filling tube 4 due to the extraction of oil, without a pressure reduction occurring in the pipe 23 in the pipe 24 and in the air space 19 of the pipe 18. The Dial switch 17 therefore remains in its neutral centre position and the signal lamp 61 is not switched on.

However, if, during the operation of the consuming apparatus a leakage in the oil tank 1 existor occurs, the warning must be given by the signal lamp 61. This is the case with the described control mechanism. Since the throttle nozzle 32 is designed so that it can only let through unthrottled just sufficient air to compensate the pressure reduction in the filling pipe 4 due to the normal removal of oil by the consumer or the feed pump 12, in the event of a greater pressure reduction in the filling tube 4 due to normal consumption of oil and simultaneous loss of oil due to a leak in the oil tank 1, a pressure reduction occurs in the filling pipe 4 which cannnot be compensated through the pressure nozzle 32. The drop in pressure is therefore propagated by way of the pipe 23 and the pipe 24 to the air space 19 in the tube 18, resulting in a displacement of the liquid 20 in the pipe 18 and consequently rotation of the dial switch 17 in the direction of the arrow B. Due to this turning of the dial switch 17, the mercury switch 48 and consequently, the circuit of the signal lamp 61 is closed, and this signal lamp 61 lights up.

Spring loaded valves or flaps may also be provided instead of the throttle nozzles 30 and 32. Since however, with any given installation, the conditions always remain the same, throttle nozzles are to be preferred to spring loaded valves or flaps, since they have no displaceable parts and can therefore not result in any breakdowns.

Furthermore, instead of the arcuate tube 18 on the dial switch 17 a container open at the bottom may be provided which is divided by a partition into two adjacent chambers and which dips into a liquid receiver arranged on the instrument panel 15, a pipe corresponding to the pipe 24, leading into one chamber, whilst the other chamber communicates with the outer air.

I claim:

The combination of a container installation for storage of liquid including a consuming device, a storage container having a manhole connection, a cover for said manhole connection, a filling tube having an upper end and a lower end and extending downwardly from said upper end through said cover with its lower end disposed low down within the container, a screw cap for closing the upper end of said filling tube, a closable ventilation pipe connected to said filling tube; a liquid extraction tube extending through said cover into the container, a feed pump having an inlet connected to said extraction tube and an outlet, and means connecting said feed pump outlet to said consuming device, with a control arrangement within said container comprising in combination, a first warning device, for indicating attainment of a maximum permissable filling level of liquid in the container, a first electric circuit for operating said first warning device, a second warning device, for indicating leakage losses of liquid from the container, a second electric circuit for operating said second warning device, a switch mechanism constructed as a liquid balance having a closed air space and first and second electric switches, said first switch being connected in said first circuit and said second switch being connected in said second circuit, a control tube extending through said cover into the container, as far as the region of said filling level, an air space in said control tube, an air space in said filling tube, a pressure equalising pipe connected to the filling tube air space and a throttle member in said pressure equalising pipe, the arrangement being such that the air space of the switching mechanism on the one hand is connected to the air space in the filling tube of the liquid container, and on the other hand, with the air space in the control tube in the cover so that during the filling of the container, after the closure of the control tube by the liquid rising in the container, a pressure increase occurs in the said control tube which is propagated to the air space of the switch mechanism and thereby effects deflection of this switch mechanism from a neutral central position in one direction involving closing of electric switch and consequently of the circuit of the second warning device, and in the event of leakage losses from the liquid container, the pressure drop caused thereby in the closed filling tube is propagated to the said air space of the switch mechanism and thereby effects deflection of this switch mechanism from a neutral centre position in the other direction involving closing of the other electric switch and consequently the circuit of the other warning device, the pressure equalising pipe line tube by being open when the liquid consuming device is in operation and closed when the liquid consumer is not in operation, said throttle member allowing through only sufficient air unthrottled as is necessary to compensate the pressure fall in the filling tube caused by the removal of liquid from the container by the consuming device.

No references cited.

ISAAC LISANN, *Primary Examiner.*